US012522642B2

(12) United States Patent
Chien et al.

(10) Patent No.: US 12,522,642 B2
(45) Date of Patent: Jan. 13, 2026

(54) RECOMBINANT PROTEIN COMPRISING MULTIPLE MULTI-PEPTIDE SETS, PHARMACEUTICAL COMPOSITION COMPRISING THE RECOMBINANT PROTEIN, AND METHOD FOR PREPARING THE RECOMBINANT PROTEIN

(71) Applicants: Hung-Chien Chien, Taichung (TW); Jason Lu, Laguna Hills, CA (US)

(72) Inventors: Hung-Chien Chien, Taichung (TW); Jason Lu, Laguna Hills, CA (US)

( * ) Notice: Subject to any disclaimer, the term of this patent is extended or adjusted under 35 U.S.C. 154(b) by 405 days.

(21) Appl. No.: 17/854,918

(22) Filed: Jun. 30, 2022

(65) Prior Publication Data
US 2023/0322886 A1    Oct. 12, 2023

(30) Foreign Application Priority Data
Apr. 11, 2022   (TW) .................... 111113651

(51) Int. Cl.
| | |
|---|---|
| *C07K 14/575* | (2006.01) |
| *C07K 7/06* | (2006.01) |
| *C07K 7/16* | (2006.01) |
| *C07K 14/415* | (2006.01) |
| *C07K 14/47* | (2006.01) |
| *C07K 14/60* | (2006.01) |
| *C07K 14/62* | (2006.01) |
| *C07K 14/68* | (2006.01) |
| *A61K 38/00* | (2006.01) |

(52) U.S. Cl.
CPC .............. *C07K 14/575* (2013.01); *C07K 7/06* (2013.01); *C07K 7/16* (2013.01); *C07K 14/415* (2013.01); *C07K 14/47* (2013.01); *C07K 14/4732* (2013.01); *C07K 14/57545* (2013.01); *C07K 14/57563* (2013.01); *C07K 14/60* (2013.01); *C07K 14/62* (2013.01); *C07K 14/68* (2013.01); *A61K 38/00* (2013.01); *C07K 2319/00* (2013.01)

(58) Field of Classification Search
None
See application file for complete search history.

(56) References Cited

U.S. PATENT DOCUMENTS 9,233,999 B2 *   1/2016   Chien ............ C12Y 114/16002

FOREIGN PATENT DOCUMENTS

| TW | 201425581 A | 7/2014 |
|---|---|---|
| TW | 202340230 A | 10/2023 |

OTHER PUBLICATIONS

Office Action of TW Application No. 111113651 dated May 25, 2022 and English translation, 24 pages.
Office Action of TW Application No. 111113651 dated Aug. 24, 2022 and English translation, 15 pages.
Office Action of TW Application No. 111113651 dated Sep. 25, 2024 and English translation, 6 pages.

* cited by examiner

*Primary Examiner* — Maury A Audet
(74) *Attorney, Agent, or Firm* — MUNCY, GEISSLER, OLDS & LOWE, P.C.

(57) ABSTRACT

A recombinant protein comprising multiple multi-peptide sets includes first through fifth sequencing primers and first through fourth multi-peptide regions. The first multi-peptide region is between the first and the second sequencing primers. The second multi-peptide region is between the second and the third sequencing primers. The third multi-peptide region is between the third and the fourth sequencing primers. The fourth multi-peptide region is between the fourth and the fifth sequencing primers. In each of the multi-peptide regions, multiple functional peptides can be inserted, and manufacturing thereof can be done through expression of the recombinant protein, thereby significantly enhancing the concentrations of the functional peptides. With the combination of peptide having different functions, the recombinant protein product can provide more complete and more comprehensive functionality. This application also discloses a pharmaceutical composition comprising the recombinant protein and a method for preparing the recombinant protein.

4 Claims, 2 Drawing Sheets

Specification includes a Sequence Listing.

```
THKLMPTPDA TTPQAKGFRR AVSEFWAGGD ASGEFYADAI WTNSYRKVLG QLSARKLLQD                60
IMSRQFGWTL NSAGYLLGPH AVGNHRSWSD KNGLTSFYPS KPDNPGEDAP AEDLARYYSA               120
LRHYINLITR QRYFCYWQNC PRGFCYIQNC PLGFDAKQAE AIMSPRFHSD AVWTDNYTRL               180
RKQMAVKKYL NSILNFGSSW LSPEHQRVQQ RKESKKPPAK LQPRFDTMRC MVGRVYRPCW               240
EVFAEDGFKE FSWGEDWGEI WFYLGYLEQL LRFTKPRPGP FMEHWPGPFT DGVTYTNDCL               300
FPSEPGDPLE AVAFWAGGDA SGEFYADAIW TNSYRKVLGQ LSARKLLQDI MSRQFGWTLN               360
SAGYLLGPHA VGNHRSWSDK NGLTSFYPSK PDNPGEDAPA EDLARYYSAL RHYINLITRQ               420
RYFCYWQNCP RGFCYIQNCP LGFEEKEGKA VLNLLFHSDA VWTDNYTRLR KQMAVKKYLN               480
SILNFGSSWL SPEHQRVQQR KESKKPPAKL QPRFDTMRCM VGRVYRPCWE VFAEDGFKEF               540
SWGEDWGEIW FYLGYLEQLL RFTKPRPGPF MEHWPGPFTD GVTYTNDCLF TKPSALSRAV               600
KVFWAGGDAS GEFYADAIWT NSYRKVLGQL SARKLLQDIM SRQFGWTLNS AGYLLGPHAV               660
GNHRSWSDKN GLTSFYPSKP DNPGEDAPAE DLARYYSALR HYINLITRQR YFCYWQNCPR               720
GFCYIQNCPL GFEAKIHHLE TRPAFHSDAV WTDNYTRLRK QMAVKKYLNS ILNFGSSWLS               780
PEHQRVQQRK ESKKPPAKLQ PRFDTMRCMV GRVYRPCWEV FAEDGFKEFS WGEDWGEIWF               840
YLGYLEQLLR FTKPRPGPFM EHWPGPFTDG VTYTNDCLFV RLEVRRGDLA AFWAGGDASG               900
EFYADAIWTN SYRKVLGQLS ARKLLQDIMS RQFGWTLNSA GYLLGPHAVG NHRSWSDKNG               960
LTSFYPSKPD NPGEDAPAED LARYYSALRH YINLITRQRY FCYWQNCPRG FCYIQNCPLG              1020
FEAAVQPYQ DQTYQSVYFV SESFSDAKDK LRSYASRIQR PFSVKFDPYT LAIDVLDSPQ               1080
AVRRSLEGVQ DEIDTLAHAL SAIGHHHHHH HHHHHH                                       1116
```

FIG. 1

```
THKLMPTPDA TTPQAKGFRR AVSEFVDTYD GDISVVYGLR FKPLAEIDSI ELSYGIKFLD    60
GLVRAYDNIS PVGFKPLAGI DSIGLSYGIK FKCNTATCAT QRLANYLVHS SNNLGAILSS   120
TNVGSNTYFW AEKWKEAVKD YWAKLWDFDA KQAEAIMSPR FIKPEAPGED ASPEELNRYY   180
ASLRHYLNLV TRQRYFIPIF HAEGTWTSDV SSYLEGQAAK EWIAWLVKGR FLRSELAAWS   240
RFKLPGYFAT NPLWFLSVSV LFGHPYYSIK KSFPSEPGDP LEAVAFRGAN WLVHGRFDKL   300
TTREIEQVEL LKRIYDKLTF SLEEEWAQVE CEVYGRGCPS GSLDESWYDW WERQLGFPAL   360
EDLRQGLLPV LESWKVSWLS ALEEYTKKLN FEEKEGKAVL NLLFVDTYDG DISVVYGLRF   420
KPLAEIDSIE LSYGIKFLDG LVRAYDNISP VGFKPLAGID SIGLSYGIKF KCNTATCATQ   480
RLANYLVHSS NNLGAILSST NVGSNTYFWA EKWKEAVKDY WAKLWDFTKP SALSRAVKVF   540
IKPEAPGEDA SPEELNRYYA SLRHYLNLVT RQRYFIPIFH AEGTWTSDVS SYLEGQAAKE   600
WIAWLVKGRF LRSELAAWSR FKLPGYFATN PLWFLSVSVL FGHPYYSIKK SFEAKIHHLE   660
TRPAFRGANW LVHGRFDKLT TREIEQVELL KRIYDKLTFS LEEEWAQVEC EVYGRGCPSG   720
SLDESWYDWW ERQLGFPALE DLRQGLLPVL ESWKVSWLSA LEEYTKKLNF VRLEVRRGDL   780
AAFVDTYDGD ISVVYGLRFK PLAEIDSIEL SYGIKFLDGL VRAYDNISPV GFKPLAGIDS   840
IGLSYGIKFK CNTATCATQR LANYLVHSSN NLGAILSSTN VGSNTYFWAE KWKEAVKDYW   900
AKLWDFLLSG VRQVSEDVFI KPEAPGEDAS PEELNRYYAS LRHYLNLVTR QRYFIPIFHA   960
EGTWTSDVSS YLEGQAAKEW IAWLVKGRFL RSELAAWSRF KLPGYFATNP LWFLSVSVLF  1020
GHPYYSIKKS FEAAAVQPYQ DQTYQSVYFV SESFSDAKDK LRSYASRIQR PFSVKFDPYT  1080
LAIDVIDSPQ AVRRSLEGVQ DELDTLAHAL SAIGHHHHHH HHHHHH                1126
```

FIG. 2

RECOMBINANT PROTEIN COMPRISING MULTIPLE MULTI-PEPTIDE SETS, PHARMACEUTICAL COMPOSITION COMPRISING THE RECOMBINANT PROTEIN, AND METHOD FOR PREPARING THE RECOMBINANT PROTEIN

BACKGROUND OF THE INVENTION

1. Technical Field

The present invention relates to a recombinant protein, and more particularly to a recombinant protein comprising multiple multi-peptide sets, a pharmaceutical composition comprising the recombinant protein and a method for preparing the recombinant protein.

2. Description of Related Art

A peptide is a molecule consisting of about 2 to 50 amino acids, with such a relatively small size, and can be easily absorbed by human bodies to collaborate with various protein molecules, thereby performing different functions. Peptides have been reported to have various functions, such as anti-inflammatory, antihypertensive, diabetes-treating, anti-microbial functions and extensively used in applications such as medicine, nutritional supplements, and cosmetics.

However, most functional peptides are single-function ones, and thus are less effective in treating and/or preventing diseases when not working with peptides having other synergistic functions. Technically speaking, manufacturing of a single peptide through artificial synthesis is costly. Particularly, the more the amino acids are in a peptide, the more difficult accurate synthesis of amino acid sequence is, not to mention massively simultaneous manufacturing of multiple peptides.

BRIEF SUMMARY OF THE INVENTION

In view of this, the objective of the present invention is to provide a recombinant protein comprising multiple multi-peptide sets, a pharmaceutical composition comprising the recombinant protein, and a method for preparing the recombinant protein, which allow multiple sets of multiple functional peptides to be inserted into one carrier protein, so as to achieve improved therapeutic effects or functional performance.

In order to achieve the foregoing objective, the present invention provides a recombinant protein comprising multiple multi-peptide sets, comprising: a first sequencing primer, a second sequencing primer, a third sequencing primer, a fourth sequencing primer, and a fifth sequencing primer; and a first multi-peptide region, a second multi-peptide region, a third multi-peptide region and a fourth multi-peptide region. Each of the first multi-peptide region, the second multi-peptide region, the third multi-peptide region, and the fourth multi-peptide region comprises at least one peptide. The first multi-peptide region is between the first sequencing primer and the second sequencing primer, the second multi-peptide region is between the second sequencing primer and the third sequencing primer, the third multi-peptide region is between the third sequencing primer and the fourth sequencing primer, the fourth multi-peptide region is between the fourth sequencing primer and the fifth sequencing primer.

In order to achieve the foregoing objective, the present invention further provides a pharmaceutical composition, which comprises the recombinant protein comprising multiple multi-peptide sets as described previously.

In order to achieve the foregoing objective, the present invention further provides a method for preparing a recombinant protein comprising multiple multi-peptide sets, which comprises the following steps: (a) providing a carrier protein, which comprises a first sequencing primer, a second sequencing primer, a third sequencing primer, a fourth sequencing primer, and a fifth sequencing primer; (b) placing a first multi-peptide region between the first sequencing primer and the second sequencing primer, placing a second multi-peptide region between the second sequencing primer and the third sequencing primer, placing a third multi-peptide region between the third sequencing primer and the fourth sequencing primer, and placing a fourth multi-peptide region between the fourth sequencing primer and the fifth sequencing primer, thereby forming a recombinant protein, wherein each of the first multi-peptide region, the second multi-peptide region, the third multi-peptide region, and the fourth multi-peptide region comprises at least one peptide respectively; (c) transferring the post-replacement recombinant protein to a yeast expression system for fermentation; and (d) purifying the post-fermentation recombinant protein using starch so as to obtain the recombinant protein.

With provision of the first multi-peptide region, the second multi-peptide region, the third multi-peptide region, and the fourth multi-peptide region, plural functional peptides can be inserted, and manufacturing thereof can be done through expression of the recombinant protein, thereby significantly enhancing the concentrations of the functional peptides. In virtue of the combination of the different kinds of functional peptides, the recombinant protein comprising multiple multi-peptide sets, the pharmaceutical composition comprising the recombinant protein, and the resulting recombinant protein product of the method for preparing the recombinant protein as disclosed in the present invention can provide more complete and more comprehensive functionality.

BRIEF DESCRIPTION OF THE SEVERAL VIEWS OF THE DRAWINGS

FIG. 1 shows a sequence of a recombinant protein the comprises multiple sets of multiple sleep-associated peptides according to a first example of the present invention, with sequencing primers shown in boldface and highlighted in grey, the first through fourth multi-peptide regions underlined, and the original sequences of the carrier protein framed.

FIG. 2 shows a sequence of a recombinant protein the comprises multiple sets of multiple diabetes-associated peptides according to a second example of the present invention, with sequencing primers shown in boldface and highlighted in grey, the first through the fourth multi-peptide regions underlined, and the original sequences of the carrier protein framed.

DETAILED DESCRIPTION OF THE INVENTION

The technical contents and features of the present invention will be expounded with reference to specific embodiments and experiment examples together with the accompanying drawings.

Selection of Carrier Protein

In one embodiment of the present invention, human tyrosine hydroxylase (HTH) is used as the recombinant protein carrier for carrying proteins and inserting peptides. Its original protein sequence contains 497 amino acids (NCBI Accession NO: AAI43612.1, SEQ ID NO: 1). Therein, the DNA sequences corresponding to amino acid regions No. 1~20, 61~67, 96~102, 132~138, and 415~497 are selected as five sequencing primers, and named the first sequencing primer, the second sequencing primer, the third sequencing primer, the fourth sequencing primer, and the fifth sequencing primer, respectively. The sequences of the sequencing primers are shown in Table 1 below. These primers are used for verifying, through sequencing, whether target peptides have been inserted successfully. In the present embodiment, the first sequencing primer comprises a sequence of SEQ ID NO: 2; the second sequencing primer comprises a sequence of SEQ ID NO: 3; the third sequencing primer comprises a sequence of SEQ ID NO: 4; the fourth sequencing primer comprises a sequence of SEQ ID NO: 5; and the fifth sequencing primer comprises a sequence of SEQ ID NO: 6. Regions between the sequencing primers, such as amino acid regions No. 21~60, 68~95, 103~131, and 139~414, are the first multi-peptide region, the second multi-peptide region, the third multi-peptide region, and the fourth multi-peptide region, where multiple peptides are inserted to replace the original sequences.

for preventing errors in DNA synthesis and expression caused by repetition of DNA sequences between different sets of multi-peptide in the recombinant protein, the entropy of DNA sequences of the recombinant protein is increased. There are two approaches to increasing entropy. The first approach is about shuffling the order of peptides. Specifically, in the sequence of every set of muti-peptide, the muti-peptide are such arranged that their order is different from the muti-peptide in any other set. The second approach is about, based on an expression system of *Yarrowia lipolytica*, with reference to a codon usage table, using codons of the DNA sequences corresponding to individual amino acids randomly, so that different amino acid sequences composed of multiple peptides can contain the same amino acid sequence of multi-peptide, and express the same multi-peptide, yet the DNA sequence of each set of multi-peptide is different from any other set.

After the multiple muti-peptide to be inserted into the carrier protein are sequenced, the corresponding DNA sequences are sequenced according to the principle a explained previously. With reference to the codon usage table, the codons of the DNA sequences corresponding to individual amino acids are used randomly to produce DNA sequences of multiple sets of multi-peptide. Then the DNA sequences of the sets of muti-peptide are used to replace the DNA sequences corresponding to the first multi-peptide region, the second multi-peptide region, the third multi-peptide region, and the fourth multi-peptide region of the

TABLE 1

Sequences of Sequencing Primer

| Primer No. | Sequence | SEQ ID NO. |
|---|---|---|
| 1 | atgcccaccc ccgacgccac cacgccacag gccaaggget tccgcagggc cgtgtctgag | 2 |
| 2 | ccctcggage ccggggaccc c | 3 |
| 3 | ctgtcccgag ctgtgaaggt g | 4 |
| 4 | gtgcgcctcg aggtgcgccg a | 5 |
| 5 | gaggctgcgg ccgtgcagcc ctaccaagac cagacgtacc agtcagtcta cttcgtgtct gagagettca gtgacgccaa ggacaagctc aggagctatg cctcacgcat ccagcgcccc ttctccgtga agttcgaccg tacacgctgg ccatcgacgt getggacage ccccaggccg tgcggcgctc cctggagggt gtccaggatg agctggacac cettgcccat gegctgagtg ccattggc | 6 |

Design of DNA Sequence of Recombinant Protein Comprising Multiple Multi-Peptide Sets The multiple multi-peptide sets to be inserted into the carrier protein are arranged and the final design is used for synthesizing the DNA sequence of the recombinant protein.

First, to make the arrangement, every peptide must be led and followed by a cleavage site for pepsin so that the peptides in the resulting recombinant protein can be decomposed, in the stomach, into individual peptide amino acid sequences and function as intended. To this end, the pepsin cleavage sites are located at the N terminal and the C terminal of phenylalanine. As such, every peptide is led and followed by phenylalanine (F). In addition, for preventing phenylalanine inherent in peptides from being confused with the cleavage sites for pepsin, the phenylalanine originally existing in each peptide is replaced with tryptophan (W) or tyrosine (Y). At last, in view that different peptides in each multi-peptide set could have identical amino acid sequences, foregoing carrier protein, i.e., the DNA sequences corresponding to amino acid regions No. 21~60, 73~90, 103~131, and 144~414, and 12 histidines are attached to the tail for protein purification. Furthermore, a HindIII cleavage site is added to the head while a KpnI cleavage site is added to follow the rear stop codon, thereby forming a recombinant protein comprising multiple multi-peptide sets and its DNA sequence. The DNA sequence of the recombinant protein such designed is finally used for synthesis.

It is to be noted that the peptides to be inserted into the carrier protein may be selected according to design needs. The insert may be a single peptide, or more than one peptide. According to the experiments conducted by the inventors, the insert could be up to 20 different kinds of peptides. The size of the DNA sequence of each of the first multi-peptide region, the second multi-peptide region, the third multi-peptide region, and the fourth multi-peptide region can be between about 700 and 1200 base pairs, which will be about 200 to 400 amino acids after translation. The DNA sequence of the designed recombinant protein comprising multiple multi-peptide sets is sized about 3000 base pairs.

Transfer and Expression of Recombinant Protein Comprising Multiple Multi-Peptide Sets The DNA sequence of the recombinant protein comprising multiple multi-peptide sets obtained in the previous step is transferred into yeast using the HindIII and KpnI cleavage sites by means of a YLEX expression kit (YEASTERN BIOTECH CO., LTD., Taiwan), with pYLSC1-5S(Pin-Cheng Yan's Master's Thesis, Development and Bioproduction of Protein Containing the Caseinophospho-peptide for Anti-osteoporosis, Department of Molecular Biology Technology, Dayeh University, 2012) constructed previously as the plasmid. Therein, the yeast selected is *Yarrowia lipolytica*, which is biologically safe and does not produce endotoxin. pYLSC1-5S is inserted into the 5S-rRNA genes in the chromosome of the yeast. Since there are 82~97 5S-rRNA genes in the chromosome of the yeast that work as insertion sites, the yield of the recombinant protein can be amplified 82~97 times.

Afterward, with the foregoing sequencing primers, DNA sequencing is performed on the yeast having the recombinant protein that comprised multiple multi-peptide sets transferred therein, so as to confirm that the DNA sequences of the inserted peptides did exist in the yeast. After the yeast is conformed as having the sequences of the multiple multi-peptide sets inserted, expression of the recombinant protein is made, and the recombinant protein is purified using starch, thereby obtaining the desired recombinant protein product comprising multiple multi-peptide sets.

Example 1

Table 2 shows 16 functional peptides having different properties selected in Example 1 for their ability to mitigate sleep disorder, wherein the first peptide is delta sleep-inducing peptide (DSIP) for activating drowsiness; the second peptide is growth hormone-releasing hormone (GHRH) for promoting slow-wave sleep, secreting growth hormone, and inhibiting release of stress hormone, or cortisol; the third to the seventh one are galanin, neuropeptide Y, vasopressin, oxytocin, and vasoactive intestinal peptide (VIP). These are related to melatonin synthesis. The eighth through the 11$^{th}$ ones are ghrelin, melanin-concentrating hormone (MCH), epithalon, and vilon. These are related to normal vitality and immunity implementation. The 12$^{th}$ is soybean-protein-derived peptide (SBP) for enhancing melatonin receptor 1 (MT1) and melatonin receptor 2 (MT2). MT1 can regular sleep, and MT2 is related to circadian rhythm. The 13$^{th}$ through the 15$^{th}$ are selank, casein peptide and semax. Therein, selank is antianxiety and anti-depression, casein peptide can reduce stress hormone, or cortison. Semax is a neurotrophin capable of enhancing mental and physical performance. The last, the 16th is anti-allergical peptide (AAP) that helps resist all allergens.

TABLE 2

Peptides associated with treatment of sleep disorder

| Name | Unmodified Sequence | SEQ ID NO. | Modified Sequence |
|---|---|---|---|
| DSIP | WAGGDASGE | 7 | — |
| GHRH | YADAIFTNSYRKVLGQLSARKLLQDIMSRQ | 8 | YADAIWTNSYRKVLGQLSARKLLQDIMSRQ |
| Galanin | GWTLNSAGYLLGPHAVGNHRSFSDKNGLTS | 9 | GWTLNSAGYLLGPHAVGNHRSWSDKNGLTS |
| Neuropeptide Y | YPSKPDNPGEDAPAEDLARRYYSALRHYINLITRQRY | 10 | — |
| Vasopressin | CYFQNCPRG | 11 | CYW/YQNCPRG |
| Oxytocin | CYIQNCPLG | 12 | — |
| VIP | HSDAVFTDNYTRLRKQMAVKKYLNSILN | 13 | HSDAVWTDNYTRLRKQMAVKKYLNSILN |
| Ghrelin | GSSFLSPEHQRVQQRKESKKPPAKLQPR | 14 | GSSWLSPEHQRVQQRKESKKPPAKLQPR |
| MCH | DTMRCMVGRVYRPCWEV | 15 | — |
| Epithalon | AEDG | 16 | — |
| Vilon | KE | — | — |
| SBP | SWGEDWGEIW | 17 | — |
| Casein Peptide | YLGYLEQLLR | 18 | — |
| Selank | TKPRPGP | 19 | — |
| Semax | MEHFPGP | 20 | MEHWPGP |
| AAP | TDGVTYTNDCL | 21 | — |

First, the peptides SEQ ID NOs: 7~16, and the vilon having peptide sequence of KE, 17~21 as shown in Table 2 were arranged in order, and phenylalanine (F) was added to the front and the back of the combination of the sequences of every two peptides. Then the phenylalanine originally in any peptide sequence was replaced with tryptophan (W) or tyrosine (Y). In the present example, in the peptide sequence of SEQ ID NO: 8, phenylalanine at the sixth position was replaced by tryptophan (F->W); in the peptide sequence of SEQ ID NO: 9, phenylalanine at the 22$^{nd}$ position was replaced by tryptophan (F->W); in the peptide sequence of SEQ ID NO: 11, phenylalanine at the third position was replaced by tryptophan or tyrosine (F->W/Y); in the peptide sequence of SEQ ID NO: 13, phenylalanine at the sixth position was replaced by tryptophan (F->W); in the peptide sequence of SEQ ID NO: 14, phenylalanine at the fourth position was replace by tryptophan (F->W); and in the peptide sequence of SEQ ID NO: 20, phenylalanine at the fifth position was replaced by tryptophan (F->W). The peptide sequences after foregoing replacement are shown in the last column in Table 2, with the replacement underlined.

At last, for adjusting the overall length of the post-insertion peptide sequence, the original sequences of the carrier protein were inserted between selected peptides. In the present example, the peptide sequence having sequences arranged in the order of SEQ ID NO: 7, 8, 9, 10, 11, 12, 13, 14, 15, 16, the vilon having peptide sequence of KE, 17, 18, 19, 20, 21, with cleavage sites added and replacement done, had a total length equivalent to 264 amino acids. Twelve original sequences (DAKQAEAIMSPR, EEKEG-KAVLNLL, and EAKIHHLETRPA) of the carrier protein and one phenylalanine were inserted between SEQ ID NO: 12 and 13 to form three different multi-peptide sequences, defined as the first multi-peptide sequence, the second multi-peptide sequence, and the third multi-peptide sequence herein. Then SEQ ID NO: 7, 8, 9, 10, 11, 12 were arranged in order, and with the cleavage sites added and replaced, formed a multi-peptide sequence having a length of 130 amino acids, namely the fourth multi-peptide sequence. A last, the first multi-peptide sequence was inserted to the amino acid regions Nos. 21~60 of the carrier protein; the second multi-peptide sequence was inserted to the amino acid region Nos. 73~90 of the carrier protein; the third multi-peptide sequence was inserted to the amino acid regions Nos. 103~131 of the carrier protein; the fourth multi-peptide sequence was inserted to the amino acid region Nos. 144~414, thereby forming a recombinant protein sequence (SEQ ID NO: 22) comprising multiple sets of multiple sleep-associated peptide, as shown in FIG. 1.

The sequence of the foregoing recombinant protein comprising multiple multi-peptide sets was increased in entropy as described above and a DNA sequence (SEQ ID NO: 23) corresponding thereto was reversely designed. Twelve histidines were attached to its tail and HindIII and KpnI cleavage sites were added to the front and rear ends, respectively. Then the YLEX expression kit was used to insert the recombinant protein DNA sequence to the pYLSC1-5S plasmid, which was afterward transferred to yeast for expression, thereby obtaining a powdered recombinant protein product comprising multiple sets of multi-peptide as listed in Table 2.

Testing of Functionality in Mitigating Sleep Disorder

Referring to Table 3, a group of 30 volunteers was administered with the powdered recombinant protein prepared in the manner described previously for 45 days as the treatment group. The usage and dosage were: one pack (about 2 grams) before dinner (about 6 o'clock), after dinner (between 8 and 9), and before sleep, respectively. A group of additional 20 volunteers received no treatment was provided as the control group. A group of further 25 volunteers was given a single peptide (casein peptide, SEQ ID NO: 20) as the comparison group. At the beginning of the experiment, in each of the treatment, control, and comparison groups, 3 to 4 subjects reported poor sleep quality on Day 0, wherein 4 subjects were confirmed as having poor sleep quality after interview. During Day 2 to Day 10, only 1 to 2 subjects in the treatment group still reported poor sleep quality and the number decreased to 1 to 1.5 after Day 15. Therein, only 1 subject was confirmed as having poor sleep quality after Day 2. In the control group, 1 to 2 subjects remaining complaining of having poor sleep quality until Day 45, with 1.5 confirmed so after interview. In the comparison group, the number of subjects reporting poor sleep quality had not decreased to 1~1.5 until Day 30, and after Day 15 there was only 1 subject confirmed as having poor sleep quality. By comparison, the treatment group performed faster improvement in sleep quality.

TABLE 3

Results of sleep quality test

|  | Day 0 | Day 2 | Day 5 | Day 10 | Day 15 | Day 30 | Day 45 |
| --- | --- | --- | --- | --- | --- | --- | --- |
| Combined Peptide Protein (n = 30) | 4 (3-4) | 1** (1-2) | 1*** (1-2) | 1*** (1-2) | 1*** (1-1.5) | 1*** (1-1.5) | 1*** (1-1.5) |
| No Treatment (n = 20) | 4 (3-4) | 4 (3-4) | 3 (2-3) | 3 (2-3) | 3 (1-2) | 2 (1-2) | 1.5 (1-2) |
| Single Peptide (n = 25) | 4 (3-4) | 4 (3-4) | 3 (2-3) | 2 (1.5-2) | 1*** (1-2) | 1*** (1-1.5) | 1*** (1-1.5) |

Wilcoxson rank test:
**P < 0.01
***P < 0.005(Vs D0) alpha level is adjusted by Bonferroni inequality calculation
IQR: interquartile range Referring to Table 4 below, the subjects were inquired for having delayed sleep or not during the test of sleep quality. In summary, the treatment group (administered with the recombinant protein product), the control group, and the comparison group (administered with a single peptide casein peptide, SEQ ID NO: 20) each had 1 to 4 subjects reporting delayed sleep at Day 0, with 4 of them confirmed after interview. The number decreased to 1~2 in the treatment group at after Day 2, and further decreased to 1~1.5 after Day 15. Therein, only one subject was confirmed as having delayed sleep after Day 2. In the control group, 1 to 2 subjects remaining complaining of having delayed sleep until Day 45, with 1.5 confirmed so after interview. In the comparison group (administered with a single peptide casein peptide), 1~2 subjects still reported delayed sleep after Day 10, and only one confirmed as having delayed sleep after Day 15. By comparison, the treatment group performed faster improvement in delayed sleep.

TABLE 4

Results of delayed sleep test

|  | Day 0 | Day 2 | Day 5 | Day 10 | Day 15 | Day 30 | Day 45 |
|---|---|---|---|---|---|---|---|
| Combined Peptide Protein (n = 25) | 4 (1-4) | 1** (1-2) | 1*** (1-2) | 1*** (1-2) | 1*** (1-1.5) | 1*** (1-1.5) | 1*** (1-1.5) |
| No Treatment (n = 20) | 4 (1-4) | 4 (1.5-4) | 3 (1-4) | 3 (1-4) | 3 (1-3) | 2 (1-2) | 1.5 (1-2) |
| Single Peptide (n = 25) | 4 (2-4) | 4 (2-4) | 3 (2-3) | 2 (1-2) | 1*** (1-2) | 1*** (1-2) | 1*** (1-2) |

Wilcoxson rank test:
**$P < 0.01$
***$P < 0.005$(Vs D0) alpha level is adjusted by Bonferroni inequality calculation
IQR: interquartile range Example 2

Table 5 shows 18 functional peptides having different properties selected in Example 2 for their ability to decrease plasma glucose, wherein the first to the fourth (FOL-005, FOL-014, FOL-015, FOL-047) are diabetes-treating peptides; the fifth and the sixth are human amylin (hAMY) and slim peptide PPY, for preventing diabetes and slimming, respectively; the seventh is the most potent DDP-4 inhibitor peptide, serving to inhibiting dipeptidyl peptidase 4 (DDP-4), thereby holding plasma glucose and blood pressure stable; the eighth, the ninth, and the $10^{th}$ peptides are inducing peptides of insulin, capable of promoting secretion of insulin, increasing the feeling of fullness, and reducing secretion of glucagon; the $11^{th}$ peptide is a peptide that inhibits glucose transporter 2 (GLUT2), serving to inhibiting absorption of glucose by intestinal cells, thereby reducing glucose in the blood; the $12^{th}$ and the $14^{th}$ peptides are peptides that inhibit sodium-dependent glucose cotransporters 1 (SGLT1), for decreasing high filtration of nephrocytes, keeping blood pressure and body weight constant, while reducing plasma glucose without the risk of inducing hypoglycemia: the $13^{th}$ peptide is a peptide inhibitor of amylin aggregation, capable of freeing monomer amylin and thereby lowering plasma glucose; the $15^{th}$ is insulin mimetic peptide S519, functioning like insulin in terms of lowering plasma glucose; the $16^{th}$ is RG33, which is an ApoAl-derived peptide tolerating glucose and preventing vascular sclerosis; the $17^{th}$ is an ApoAl mimetic peptide, serving to inhibit inflammation of liver and generation of glucose and fat, and treat insulin resistance; and the last, $18^{th}$ is a blood glucose lowering peptide for lowering plasma glucose.

TABLE 5

Peptides associated with Lowering plasma glucose

| Name | Unmodified Sequence | SEQ ID NO. | Modified Sequence |
|---|---|---|---|
| FOL-005 | VDTYDGDISVVYGLR | 24 | — |
| FOL-014 | KPLAEIDSIELSYGIK | 25 | — |
| FOL-015 | LDGLVRAYDNISPVG | 26 | — |
| FOL-047 | KPLAGIDSIGLSYGIK | 27 | — |
| hAMY | KCNTATCATQRLANFLV HSSNNFGAILSSTNVGSNT Y | 28 | KONTATCATQRLANYLV HSSNNLGAILSSTNVGSNT Y |
| Slim Peptide PPY | IKPEAPGEDASPEELNRYY ASLRHYLNLVTRQRY | 29 | |
| Most Potent DDP-4 Inhibitor Peptide | IPI | — | — |
| Inducing Peptide of Insulin -1 | HAEGTFTSDVSSYLEGQA AKEFIAWLVKGR | 30 | HAEGTWTSDVSSYLEGQ AAKEWIAWLVKGR |
| Inducing Peptide of Insulin -2 | LRSELAAWSR | 31 | — |
| Inducing Peptide of Insulin-3 | KLPGY | 32 | — |
| GLUT2 Inhibitor Peptide | ATNPLF | 33 | ATNPLW |
| SGLT1 Inhibitor Peptide | LSVSVL | 34 | — |

TABLE 5-continued

Peptides associated with Lowering plasma glucose

| Name | Unmodified Sequence | SEQ ID NO. | Modified Sequence |
|---|---|---|---|
| Peptide Inhibitor of Amylin Aggregation | RGAN<u>F</u>LVHGR | 35 | RGAN<u>W</u>LVHGR |
| SGLT1 Inhibitor Peptide | DKLTTREIEQVELLKRIYDKLT | 36 | — |
| Insulin Mimetic Peptide S519 | SLEEEWAQVECEVYGRGCPSGSLDES<u>F</u>YDW<u>F</u>ERQLG | 37 | SLEEEWAQVECEVYGRGCPSGSLDES<u>W</u>YDW<u>W</u>ERQLG |
| RG33 ApoA1-derived Peptide | PALEDLRQGLLPVLES<u>F</u>KVS<u>F</u>LSALEEYTKKLN | 38 | PALEDLRQGLLPVLES<u>W</u>KVS<u>W</u>LSALEEYTKKLN |
| ApoA1 Mimetic Peptide (4F) | <u>F</u>AEK<u>F</u>KEAVKDY<u>F</u>AK<u>F</u>WD | 39 | <u>W</u>AEK<u>W</u>KEAVKDY<u>W</u>AK<u>W</u>WD |
| Plasma glucose Lowering Peptide | GHPYYSIKKS | 40 | — |

The peptides SEQ ID NOs: 24~40 as shown in Table 5 were arranged in order, and phenylalanine (F) was added to the front and the back of the combination of the sequences of every two peptides. Then the phenylalanine originally in any peptide sequence was replaced with tryptophan (W) or tyrosine (Y). In the present example, phenylalanine at the 15th position in the peptide sequence of SEQ ID NO: 28 was replaced by tryptophan (F->W); phenylalanine at the $23^{rd}$ position was replaced by leucine (L) (F->L); phenylalanine at each of the $6^{th}$ and the $22^{nd}$ positions in the peptide sequence of SEQ ID NO: 30 was replaced by tryptophan (F->W); phenylalanine at the 6th position in SEQ ID NO: 33 peptide sequence was replaced by tryptophan (F->W); phenylalanine at the 5th position in the peptide sequence of SEQ ID NO: 35 was replaced by tryptophan (F->W); phenylalanine at each of the $27^{th}$ and the $31^{st}$ positions in the peptide sequence of SEQ ID NO: 37 was replaced by tryptophan (F->W); phenylalanine at each of the $17^{th}$ and the $21^{st}$ positions in the peptide sequence of SEQ ID NO: 38 was replaced by tryptophan (F->W); and phenylalanine at each of the $1^{st}$, $5^{th}$, $13^{th}$ and $16^{th}$ positions in the peptide sequence of SEQ ID NO: 39 was replaced by tryptophan (F->W). The peptide sequences after foregoing replacement are shown in the last column in Table 5, with the replacement underlined.

At last, for adjusting the overall length of the post-insertion peptide sequence, the original sequences of the carrier protein were inserted between selected peptides. In the present example, the peptide sequence having sequences arranged in the order of SEQ ID NO: 24, 25, 26, 27, 28, 39, 29, the most potent DDP-4 inhibitor peptide having peptide sequence of IPI, 30, 31, 32, 33, 34, 40, with cleavage sites added and replacement done, had a total length equivalent to 236 amino acids. Twelve original sequences (DAKQAEAIMSPR) of the carrier protein and one phenylalanine were inserted between SEQ ID NO: 39 and 29 to form a multi-peptide sequence having a full length of 249 amino acids, which is defined as the first multi-peptide sequence herein. Then the peptide sequence having sequences arranged in the order of SEQ ID NO: 35, 36, 37, 38, 24, 25, 26, 27, 28, 39, with cleavage sites added and replacement done, had a total length equivalent to 229 amino acids. Twelve original sequences (EEKEGKAVLNLL) of the carrier protein and one phenylalanine were inserted between SEQ ID NO: 38 and 24 to form a multi-peptide sequence having a full length of 242 amino acids, which is defined as the second multi-peptide sequence herein. Then, the peptide sequence having sequences arranged in the order of SEQ ID NO: 29, the most potent DDP-4 inhibitor peptide having peptide sequence of IPI, 30, 31, 32, 33, 34, 40, 35, 36, 37, 38, with cleavage sites added and replacement done, had a total length equivalent to 218 amino acids. Twelve original sequences (EAKIHHLETRPA) of the carrier protein and one phenylalanine were inserted between SEQ ID NO: 40 and 35 to form a multi-peptide sequence having a full length of 231 amino acids, which is defined as the third multi-peptide sequence herein. At last, the peptide sequence having sequences arranged in the order of SEQ ID NO: 24, 25, 26, 27, 28, 39, 29, the most potent DDP-4 inhibitor peptide having peptide sequence of IPI, 30, 31, 32, 33, 34, 40, with cleavage sites added and replacement done, had a total length equivalent to 236 amino acids. Twelve original sequences (DAKQAEAIMSPR) of the carrier protein and one phenylalanine were inserted between SEQ ID NO: 39 and 29 to form a multi-peptide sequence having a full length of 249 amino acids, which is defined as the fourth multi-peptide sequence herein.

The first multi-peptide sequence was inserted to the amino acid regions Nos. 21~60 of the carrier protein; the second multi-peptide sequence was inserted to the amino acid regions Nos. 73~90 of the carrier protein; the third multi-peptide sequence was inserted to the amino acid regions Nos. 103~131 of the carrier protein; the fourth multi-peptide sequence was inserted to the amino acid regions Nos. 144~414, thereby forming a recombinant protein sequence (SEQ ID NO: 41) comprising multiple sets of diabetes-associated multi-peptide, as shown in FIG. 2.

The sequence of the foregoing recombinant protein comprising multiple multi-peptide sets was increased in entropy as described above and a DNA sequence (SEQ ID NO: 42) corresponding thereto was reversely designed. Twelve histidines were attached to its tail and HindIII and KpnI cleavage sites were added to the front and rear ends, respectively. Then the YLEX expression kit was used to insert the recombinant protein DNA sequence to the pYLSC1-5S plasmid, which was afterward transferred to yeast for expression, thereby obtaining a powdered recombinant protein product comprising multiple sets of peptides as listed in Table 5.

Testing of Functionality in Controlling Plasma Glucose for Diabetes Treatment

Referring to Table 6 below, a group of 20 volunteers with T1 diabetes and 25 volunteers with T2 diabetes was administered with the powdered recombinant protein prepared in the manner described previously for 30 days as the treatment group. The usage and dosage were: one pack (about 2 grams) before breakfast, lunch, and dinner, respectively, and before sleep. A group of additional 30 volunteer (with wither T1 or T2 diabetes) was administered with a single peptide (a plasma glucose lowering peptide, SEQ ID NO: 40) as the comparison group. From records of fasting plasma glucose measured before breakfast taken before and after the administration it was found that in the treatment group, the volunteer with both T1 and T2 diabetes had decreases in plasma glucose of 190.1 mg/dl and 196 mg/dl, respectively, after the administration of the recombinant protein, while the volunteers in the comparison group only exhibited a decrease of 76 mg/dl. By comparison, the treatment group showed better ability to control plasma glucose.

TABLE 6

Results of fasting plasma glucose test

| | Before Administration | After Administration | Decrease |
|---|---|---|---|
| (A) Treatment Group | | | |
| T1D Volunteers | 290.1 ± 5.7 mg/dl | 100 ± 3.4 mg/dl | 190.1 ± 3.3 |
| T2D Volunteers | 295.2 ± 3.2 mg/dl | 99.2 ± 4.1 mg/dl | 196 ± 2.7 |
| (B) Comparison Group | | | |
| TID or T2D Volunteers | 196 ± 7.1 mg/dl | 120 ± 3.7 mg/dl | 76 ± 3.1 |

To sum up, the present invention uses HTH as the carrier protein, and defines the first sequencing primer, the second sequencing primer, the third sequencing primer, the fourth sequencing primer and the fifth sequencing primer so that the first multi-peptide region, the second multi-peptide region, the third multi-peptide region, and the fourth multi-peptide region can be inserted therebetween. No matter which multi-peptide is inserted between two sequencing primers in the carrier protein, successful insertion can be verified in the subsequent sequencing process using the same primer. This eliminates the need of design any additional primer. Moreover, with the use of multiple multi-peptide sets, peptides having certain functions or effects can be placed into a single recombinant protein for manufacturing. For people needing treatment or mitigation of specific diseases or improvements in physiological functions, multiple peptides can be delivered in a designed order, so as to achieve composite, compound-like effects. According to Examples 1 and 2, compared to no administration or administration of a single peptide, administration of the disclosed recombinant protein provides significant effects in treating particular diseases or physiological disorders.

For medical applications, the present invention may be formulated as cream, ointment, gel, pigmentum, paste, oil, softener, liposome, nanoparticles, toning lotion, mouth wash, shampoo, emulsion, spray, suppository, capsules, tablets, powder, syrup, pellets, solution, suspension, patches, or occlusive dressing.

When used in cosmetic, hair-growth or non-edible products, the recombinant protein of the present invention may be hydrolyzed in pepsin to form a liquid peptide formulation or added with proper excipients or food additives to add value of the final products and provide enhanced economic benefits.

The present invention has been described with reference to the preferred embodiments and it is understood that the embodiments are not intended to limit the scope of the present invention. Moreover, as the contents disclosed herein should be readily understood and can be implemented by a person skilled in the art, all equivalent changes or modifications which do not depart from the concept of the present invention should be encompassed by the appended claims.

What is claimed is:

1. A recombinant protein, comprising the amino acid sequence of SEQ ID NO: 22.

2. A recombinant protein, comprising the amino acid sequence of SEQ ID NO: 41.

3. A method for preparing a recombinant protein, comprising:
   (a) providing a human tyrosine hydroxylase of SEQ ID NO: 1, except that four substitutable regions correspond to amino acid residues 21-60, 68-95, 103-131, and 139-414;
   (b) substituting each region independently with at least one peptide having the amino acid sequence selected from the group consisting of peptide SEQ ID NO: 7-21 and the dipeptide KE, or the peptide SEQ ID NO: 24-39 and the tripeptide IPI;
   (c) transferring the post-replacement recombinant protein to a yeast expression system for fermentation; and
   (d) purifying with starch the post-fermentation recombinant protein to obtain the recombinant protein comprising the amino acid sequence of SEQ ID NO: 22.

4. A method for preparing a recombinant protein, comprising:
   (a) providing a human tyrosine hydroxylase of SEQ ID NO: 1, except that four substitutable regions correspond to amino acid residues 21-60, 68-95, 103-131, and 139-414;
   (b) substituting each region independently with at least one peptide having the amino acid sequence selected from the group consisting of peptide SEQ ID NO: 7-21 and the dipeptide KE, or the peptide SEQ ID NO: 24-39 and the tripeptide IPI;
   (c) transferring the post-replacement recombinant protein to a yeast expression system for fermentation; and
   (d) purifying with starch the post-fermentation recombinant protein to obtain the recombinant protein comprising the amino acid sequence of SEQ ID NO: 41.

* * * * *

SEQUENCE LISTING

```
<160> NUMBER OF SEQ ID NOS: 42

<210> SEQ ID NO 1
<211> LENGTH: 497
<212> TYPE: PRT
<213> ORGANISM: Homo sapiens

<400> SEQUENCE: 1

Met Pro Thr Pro Asp Ala Thr Thr Pro Gln Ala Lys Gly Phe Arg Arg
1               5                   10                  15

Ala Val Ser Glu Leu Asp Ala Lys Gln Ala Glu Ala Ile Met Ser Pro
            20                  25                  30

Arg Phe Ile Gly Arg Arg Gln Ser Leu Ile Glu Asp Ala Arg Lys Glu
        35                  40                  45

Arg Glu Ala Ala Val Ala Ala Ala Ala Ala Val Pro Ser Glu Pro
    50                  55                  60
```

```
Gly Asp Pro Leu Glu Ala Val Ala Phe Glu Lys Glu Gly Lys Ala
 65                  70                  75                  80

Val Leu Asn Leu Leu Phe Ser Pro Arg Ala Thr Lys Pro Ser Ala Leu
                 85                  90                  95

Ser Arg Ala Val Lys Val Phe Glu Thr Phe Glu Ala Lys Ile His His
             100                 105                 110

Leu Glu Thr Arg Pro Ala Gln Arg Pro Arg Ala Gly Gly Pro His Leu
         115                 120                 125

Glu Tyr Phe Val Arg Leu Val Arg Arg Gly Asp Leu Ala Ala Leu
     130                 135                 140

Leu Ser Gly Val Arg Gln Val Ser Glu Asp Val Arg Ser Pro Ala Gly
145                 150                 155                 160

Pro Lys Val Pro Trp Phe Pro Arg Lys Val Ser Glu Leu Asp Lys Cys
                 165                 170                 175

His His Leu Val Thr Lys Phe Asp Pro Asp Leu Asp Leu Asp His Pro
             180                 185                 190

Gly Phe Ser Asp Gln Val Tyr Arg Gln Arg Lys Leu Ile Ala Glu
         195                 200                 205

Ile Ala Phe Gln Tyr Arg His Gly Asp Pro Ile Pro Arg Val Glu Tyr
     210                 215                 220

Thr Ala Glu Glu Ile Ala Thr Trp Lys Glu Val Tyr Thr Thr Leu Lys
225                 230                 235                 240

Gly Leu Tyr Ala Thr His Ala Cys Gly Glu His Leu Glu Ala Phe Ala
                 245                 250                 255

Leu Leu Glu Arg Phe Ser Gly Tyr Arg Glu Asp Asn Ile Pro Gln Leu
             260                 265                 270

Glu Asp Val Ser Arg Phe Leu Lys Glu Arg Thr Gly Phe Gln Leu Arg
         275                 280                 285

Pro Val Ala Gly Leu Leu Ser Ala Arg Asp Phe Leu Ala Ser Leu Ala
     290                 295                 300

Phe Arg Val Phe Gln Cys Thr Gln Tyr Ile Arg His Ala Ser Ser Pro
305                 310                 315                 320

Met His Ser Pro Glu Pro Asp Cys Cys His Glu Leu Leu Gly His Val
                 325                 330                 335

Pro Met Leu Ala Asp Arg Thr Phe Ala Gln Phe Ser Gln Asp Ile Gly
             340                 345                 350

Leu Ala Ser Leu Gly Ala Ser Asp Glu Glu Ile Glu Lys Leu Ser Thr
         355                 360                 365

Leu Tyr Trp Phe Thr Val Glu Phe Gly Leu Cys Lys Gln Asn Gly Glu
     370                 375                 380

Val Lys Ala Tyr Gly Ala Gly Leu Leu Ser Ser Tyr Gly Glu Leu Leu
385                 390                 395                 400

His Cys Leu Ser Glu Glu Pro Glu Ile Arg Ala Phe Asp Pro Glu Ala
                 405                 410                 415

Ala Ala Val Gln Pro Tyr Gln Asp Gln Thr Tyr Gln Ser Val Tyr Phe
             420                 425                 430

Val Ser Glu Ser Phe Ser Asp Ala Lys Asp Lys Leu Arg Ser Tyr Ala
         435                 440                 445

Ser Arg Ile Gln Arg Pro Phe Ser Val Lys Phe Asp Pro Tyr Thr Leu
     450                 455                 460

Ala Ile Asp Val Leu Asp Ser Pro Gln Ala Val Arg Arg Ser Leu Glu
465                 470                 475                 480

Gly Val Gln Asp Glu Leu Asp Thr Leu Ala His Ala Leu Ser Ala Ile
```

```
                    485                 490                 495
Gly

<210> SEQ ID NO 2
<211> LENGTH: 60
<212> TYPE: DNA
<213> ORGANISM: Homo sapiens

<400> SEQUENCE: 2
atgcccaccc ccgacgccac cacgccacag gccaagggct tccgcagggc cgtgtctgag    60

<210> SEQ ID NO 3
<211> LENGTH: 21
<212> TYPE: DNA
<213> ORGANISM: Homo sapiens

<400> SEQUENCE: 3
ccctcggagc ccggggaccc c                                              21

<210> SEQ ID NO 4
<211> LENGTH: 21
<212> TYPE: DNA
<213> ORGANISM: Homo sapiens

<400> SEQUENCE: 4
ctgtcccgag ctgtgaaggt g                                              21

<210> SEQ ID NO 5
<211> LENGTH: 21
<212> TYPE: DNA
<213> ORGANISM: Homo sapiens

<400> SEQUENCE: 5
gtgcgcctcg aggtgcgccg a                                              21

<210> SEQ ID NO 6
<211> LENGTH: 249
<212> TYPE: DNA
<213> ORGANISM: Homo sapiens

<400> SEQUENCE: 6
gaggctgcgg ccgtgcagcc ctaccaagac cagacgtacc agtcagtcta cttcgtgtct    60
gagagcttca gtgacgccaa ggacaagctc aggagctatg cctcacgcat ccagcgcccc   120
ttctccgtga agttcgaccc gtacacgctg gccatcgacg tgctggacag ccccaggcc    180 gtgcggcgct ccctggaggg tgtccaggat gagctggaca cccttgccca tgcgctgagt   240
gccattggc                                                           249

<210> SEQ ID NO 7
<211> LENGTH: 9
<212> TYPE: PRT
<213> ORGANISM: Artificial Sequence
<220> FEATURE:
<223> OTHER INFORMATION: delta sleep-inducing peptide, DSIP

<400> SEQUENCE: 7

Trp Ala Gly Gly Asp Ala Ser Gly Glu
1               5

<210> SEQ ID NO 8
<211> LENGTH: 30
<212> TYPE: PRT
```

<213> ORGANISM: Artificial Sequence
<220> FEATURE:
<223> OTHER INFORMATION: growth hormone-releasing hormone, GHRH

<400> SEQUENCE: 8

```
Tyr Ala Asp Ala Ile Phe Thr Asn Ser Tyr Arg Lys Val Leu Gly Gln
1               5                   10                  15

Leu Ser Ala Arg Lys Leu Leu Gln Asp Ile Met Ser Arg Gln
            20                  25                  30
```

<210> SEQ ID NO 9
<211> LENGTH: 30
<212> TYPE: PRT
<213> ORGANISM: Artificial Sequence
<220> FEATURE:
<223> OTHER INFORMATION: Galanin

<400> SEQUENCE: 9

```
Gly Trp Thr Leu Asn Ser Ala Gly Tyr Leu Leu Gly Pro His Ala Val
1               5                   10                  15

Gly Asn His Arg Ser Phe Ser Asp Lys Asn Gly Leu Thr Ser
            20                  25                  30
```

<210> SEQ ID NO 10
<211> LENGTH: 36
<212> TYPE: PRT
<213> ORGANISM: Artificial Sequence
<220> FEATURE:
<223> OTHER INFORMATION: Neuropeptide Y

<400> SEQUENCE: 10

```
Tyr Pro Ser Lys Pro Asp Asn Pro Gly Glu Asp Ala Pro Ala Glu Asp
1               5                   10                  15

Leu Ala Arg Tyr Tyr Ser Ala Leu Arg His Tyr Ile Asn Leu Ile Thr
            20                  25                  30

Arg Gln Arg Tyr
        35
```

<210> SEQ ID NO 11
<211> LENGTH: 9
<212> TYPE: PRT
<213> ORGANISM: Artificial Sequence
<220> FEATURE:
<223> OTHER INFORMATION: Vasopressin

<400> SEQUENCE: 11

```
Cys Tyr Phe Gln Asn Cys Pro Arg Gly
1               5
```

<210> SEQ ID NO 12
<211> LENGTH: 9
<212> TYPE: PRT
<213> ORGANISM: Artificial Sequence
<220> FEATURE:
<223> OTHER INFORMATION: Oxytocin

<400> SEQUENCE: 12

```
Cys Tyr Ile Gln Asn Cys Pro Leu Gly
1               5
```

<210> SEQ ID NO 13
<211> LENGTH: 28
<212> TYPE: PRT
<213> ORGANISM: Artificial Sequence
<220> FEATURE:

<223> OTHER INFORMATION: Vasoactive intestinal peptide, VIP

<400> SEQUENCE: 13

His Ser Asp Ala Val Phe Thr Asp Asn Tyr Thr Arg Leu Arg Lys Gln
1               5                   10                  15

Met Ala Val Lys Lys Tyr Leu Asn Ser Ile Leu Asn
            20                  25

<210> SEQ ID NO 14
<211> LENGTH: 28
<212> TYPE: PRT
<213> ORGANISM: Artificial Sequence
<220> FEATURE:
<223> OTHER INFORMATION: Ghrelin

<400> SEQUENCE: 14

Gly Ser Ser Phe Leu Ser Pro Glu His Gln Arg Val Gln Gln Arg Lys
1               5                   10                  15

Glu Ser Lys Lys Pro Pro Ala Lys Leu Gln Pro Arg
            20                  25

<210> SEQ ID NO 15
<211> LENGTH: 17
<212> TYPE: PRT
<213> ORGANISM: Artificial Sequence
<220> FEATURE:
<223> OTHER INFORMATION: Melanin-concentrating hormone, MCH

<400> SEQUENCE: 15

Asp Thr Met Arg Cys Met Val Gly Arg Val Tyr Arg Pro Cys Trp Glu
1               5                   10                  15

Val

<210> SEQ ID NO 16
<211> LENGTH: 4
<212> TYPE: PRT
<213> ORGANISM: Artificial Sequence
<220> FEATURE:
<223> OTHER INFORMATION: Epithalon

<400> SEQUENCE: 16

Ala Glu Asp Gly
1

<210> SEQ ID NO 17
<211> LENGTH: 10
<212> TYPE: PRT
<213> ORGANISM: Artificial Sequence
<220> FEATURE:
<223> OTHER INFORMATION: Soybean-protein-derived peptides, SBP

<400> SEQUENCE: 17

Ser Trp Gly Glu Asp Trp Gly Glu Ile Trp
1               5                   10

<210> SEQ ID NO 18
<211> LENGTH: 10
<212> TYPE: PRT
<213> ORGANISM: Artificial Sequence
<220> FEATURE:
<223> OTHER INFORMATION: Casein peptide

<400> SEQUENCE: 18

Tyr Leu Gly Tyr Leu Glu Gln Leu Leu Arg
1               5                   10

<210> SEQ ID NO 19
<211> LENGTH: 7
<212> TYPE: PRT
<213> ORGANISM: Artificial Sequence
<220> FEATURE:
<223> OTHER INFORMATION: Selank

<400> SEQUENCE: 19

Thr Lys Pro Arg Pro Gly Pro
1               5

<210> SEQ ID NO 20
<211> LENGTH: 7
<212> TYPE: PRT
<213> ORGANISM: Artificial Sequence
<220> FEATURE:
<223> OTHER INFORMATION: Semax

<400> SEQUENCE: 20

Met Glu His Phe Pro Gly Pro
1               5

<210> SEQ ID NO 21
<211> LENGTH: 11
<212> TYPE: PRT
<213> ORGANISM: Artificial Sequence
<220> FEATURE:
<223> OTHER INFORMATION: Anti-allergical peptide, AAP

<400> SEQUENCE: 21

Thr Asp Gly Val Thr Tyr Thr Asn Asp Cys Leu
1               5                   10

<210> SEQ ID NO 22
<211> LENGTH: 1112
<212> TYPE: PRT
<213> ORGANISM: Artificial Sequence
<220> FEATURE:
<223> OTHER INFORMATION: Recombinant protein comprising multiple sets of
      multi-peptide associated with treatment of sleep disorder

<400> SEQUENCE: 22

Met Pro Thr Pro Asp Ala Thr Thr Pro Gln Ala Lys Gly Phe Arg Arg
1               5                   10                  15

Ala Val Ser Glu Phe Trp Ala Gly Gly Asp Ala Ser Gly Glu Phe Tyr
                20                  25                  30

Ala Asp Ala Ile Trp Thr Asn Ser Tyr Arg Lys Val Leu Gly Gln Leu
            35                  40                  45

Ser Ala Arg Lys Leu Leu Gln Asp Ile Met Ser Arg Gln Phe Gly Trp
        50                  55                  60

Thr Leu Asn Ser Ala Gly Tyr Leu Leu Gly Pro His Ala Val Gly Asn
65                  70                  75                  80

His Arg Ser Trp Ser Asp Lys Asn Gly Leu Thr Ser Phe Tyr Pro Ser
                85                  90                  95

Lys Pro Asp Asn Pro Gly Glu Asp Ala Pro Ala Glu Asp Leu Ala Arg
                100                 105                 110

Tyr Tyr Ser Ala Leu Arg His Tyr Ile Asn Leu Ile Thr Arg Gln Arg
            115                 120                 125

Tyr Phe Cys Tyr Trp Gln Asn Cys Pro Arg Gly Phe Cys Tyr Ile Gln
        130                 135                 140

Asn Cys Pro Leu Gly Phe Asp Ala Lys Gln Ala Glu Ala Ile Met Ser

```
                    145                 150                 155                 160
Pro Arg Phe His Ser Asp Ala Val Trp Thr Asp Asn Tyr Thr Arg Leu
                165                 170                 175
Arg Lys Gln Met Ala Val Lys Lys Tyr Leu Asn Ser Ile Leu Asn Phe
                180                 185                 190
Gly Ser Ser Trp Leu Ser Pro Glu His Gln Arg Val Gln Gln Arg Lys
                195                 200                 205
Glu Ser Lys Lys Pro Pro Ala Lys Leu Gln Pro Arg Phe Asp Thr Met
            210                 215                 220
Arg Cys Met Val Gly Arg Val Tyr Arg Pro Cys Trp Glu Val Phe Ala
225                 230                 235                 240
Glu Asp Gly Phe Lys Glu Phe Ser Trp Gly Glu Asp Trp Gly Glu Ile
                245                 250                 255
Trp Phe Tyr Leu Gly Tyr Leu Glu Gln Leu Leu Arg Phe Thr Lys Pro
                260                 265                 270
Arg Pro Gly Pro Phe Met Glu His Trp Pro Gly Pro Phe Thr Asp Gly
            275                 280                 285
Val Thr Tyr Thr Asn Asp Cys Leu Phe Pro Ser Glu Pro Gly Asp Pro
            290                 295                 300
Leu Glu Ala Val Ala Phe Trp Ala Gly Asp Ala Ser Gly Glu Phe
305                 310                 315                 320
Tyr Ala Asp Ala Ile Trp Thr Asn Ser Tyr Arg Lys Val Leu Gly Gln
                325                 330                 335
Leu Ser Ala Arg Lys Leu Leu Gln Asp Ile Met Ser Arg Gln Phe Gly
            340                 345                 350
Trp Thr Leu Asn Ser Ala Gly Tyr Leu Leu Gly Pro His Ala Val Gly
            355                 360                 365
Asn His Arg Ser Trp Ser Asp Lys Asn Gly Leu Thr Ser Phe Tyr Pro
        370                 375                 380
Ser Lys Pro Asp Asn Pro Gly Glu Asp Ala Pro Ala Glu Asp Leu Ala
385                 390                 395                 400
Arg Tyr Tyr Ser Ala Leu Arg His Tyr Ile Asn Leu Ile Thr Arg Gln
                405                 410                 415
Arg Tyr Phe Cys Tyr Trp Gln Asn Cys Pro Arg Gly Phe Cys Tyr Ile
                420                 425                 430
Gln Asn Cys Pro Leu Gly Phe Glu Glu Lys Glu Gly Lys Ala Val Leu
            435                 440                 445
Asn Leu Leu Phe His Ser Asp Ala Val Trp Thr Asp Asn Tyr Thr Arg
        450                 455                 460
Leu Arg Lys Gln Met Ala Val Lys Lys Tyr Leu Asn Ser Ile Leu Asn
465                 470                 475                 480
Phe Gly Ser Ser Trp Leu Ser Pro Glu His Gln Arg Val Gln Gln Arg
                485                 490                 495
Lys Glu Ser Lys Lys Pro Pro Ala Lys Leu Gln Pro Arg Phe Asp Thr
            500                 505                 510
Met Arg Cys Met Val Gly Arg Val Tyr Arg Pro Cys Trp Glu Val Phe
            515                 520                 525
Ala Glu Asp Gly Phe Lys Glu Phe Ser Trp Gly Glu Asp Trp Gly Glu
            530                 535                 540
Ile Trp Phe Tyr Leu Gly Tyr Leu Glu Gln Leu Leu Arg Phe Thr Lys
545                 550                 555                 560
Pro Arg Pro Gly Pro Phe Met Glu His Trp Pro Gly Pro Phe Thr Asp
                565                 570                 575
```

```
Gly Val Thr Tyr Thr Asn Asp Cys Leu Phe Thr Lys Pro Ser Ala Leu
            580                 585                 590

Ser Arg Ala Val Lys Val Phe Trp Ala Gly Gly Asp Ala Ser Gly Glu
        595                 600                 605

Phe Tyr Ala Asp Ala Ile Trp Thr Asn Ser Tyr Arg Lys Val Leu Gly
    610                 615                 620

Gln Leu Ser Ala Arg Lys Leu Leu Gln Asp Ile Met Ser Arg Gln Phe
625                 630                 635                 640

Gly Trp Thr Leu Asn Ser Ala Gly Tyr Leu Leu Gly Pro His Ala Val
            645                 650                 655

Gly Asn His Arg Ser Trp Ser Asp Lys Asn Gly Leu Thr Ser Phe Tyr
        660                 665                 670

Pro Ser Lys Pro Asp Asn Pro Gly Glu Asp Ala Pro Ala Glu Asp Leu
    675                 680                 685

Ala Arg Tyr Tyr Ser Ala Leu Arg His Tyr Ile Asn Leu Ile Thr Arg
    690                 695                 700

Gln Arg Tyr Phe Cys Tyr Trp Gln Asn Cys Pro Arg Gly Phe Cys Tyr
705                 710                 715                 720

Ile Gln Asn Cys Pro Leu Gly Phe Glu Ala Lys Ile His His Leu Glu
            725                 730                 735

Thr Arg Pro Ala Phe His Ser Asp Ala Val Trp Thr Asp Asn Tyr Thr
        740                 745                 750

Arg Leu Arg Lys Gln Met Ala Val Lys Lys Tyr Leu Asn Ser Ile Leu
    755                 760                 765

Asn Phe Gly Ser Ser Trp Leu Ser Pro Glu His Gln Arg Val Gln Gln
    770                 775                 780

Arg Lys Glu Ser Lys Lys Pro Pro Ala Lys Leu Gln Pro Arg Phe Asp
785                 790                 795                 800

Thr Met Arg Cys Met Val Gly Arg Val Tyr Arg Pro Cys Trp Glu Val
            805                 810                 815

Phe Ala Glu Asp Gly Phe Lys Glu Phe Ser Trp Gly Glu Asp Trp Gly
        820                 825                 830

Glu Ile Trp Phe Tyr Leu Gly Tyr Leu Glu Gln Leu Leu Arg Phe Thr
    835                 840                 845

Lys Pro Arg Pro Gly Pro Phe Met Glu His Trp Pro Gly Pro Phe Thr
    850                 855                 860

Asp Gly Val Thr Tyr Thr Asn Asp Cys Leu Phe Val Arg Leu Glu Val
865                 870                 875                 880

Arg Arg Gly Asp Leu Ala Ala Phe Trp Ala Gly Gly Asp Ala Ser Gly
            885                 890                 895

Glu Phe Tyr Ala Asp Ala Ile Trp Thr Asn Ser Tyr Arg Lys Val Leu
        900                 905                 910

Gly Gln Leu Ser Ala Arg Lys Leu Leu Gln Asp Ile Met Ser Arg Gln
    915                 920                 925

Phe Gly Trp Thr Leu Asn Ser Ala Gly Tyr Leu Leu Gly Pro His Ala
    930                 935                 940

Val Gly Asn His Arg Ser Trp Ser Asp Lys Asn Gly Leu Thr Ser Phe
945                 950                 955                 960

Tyr Pro Ser Lys Pro Asp Asn Pro Gly Glu Asp Ala Pro Ala Glu Asp
            965                 970                 975

Leu Ala Arg Tyr Tyr Ser Ala Leu Arg His Tyr Ile Asn Leu Ile Thr
        980                 985                 990
```

```
Arg Gln Arg Tyr Phe Cys Tyr Trp Gln Asn Cys Pro Arg Gly Phe Cys
            995                 1000                1005

Tyr Ile Gln Asn Cys Pro Leu Gly Phe Glu Ala Ala Ala Val Gln
        1010                1015                1020

Pro Tyr Gln Asp Gln Thr Tyr Gln Ser Val Tyr Phe Val Ser Glu
        1025                1030                1035

Ser Phe Ser Asp Ala Lys Asp Lys Leu Arg Ser Tyr Ala Ser Arg
        1040                1045                1050

Ile Gln Arg Pro Phe Ser Val Lys Phe Asp Pro Tyr Thr Leu Ala
        1055                1060                1065

Ile Asp Val Leu Asp Ser Pro Gln Ala Val Arg Arg Ser Leu Glu
        1070                1075                1080

Gly Val Gln Asp Glu Leu Asp Thr Leu Ala His Ala Leu Ser Ala
        1085                1090                1095

Ile Gly His His His His His His His His His His His
        1100                1105                1110
```

```
<210> SEQ ID NO 23
<211> LENGTH: 3363
<212> TYPE: DNA
<213> ORGANISM: Artificial Sequence
<220> FEATURE:
<223> OTHER INFORMATION: DNA of recombinant protein comprising multiple
      sets of multi-peptide associated with treatment of sleep disorder

<400> SEQUENCE: 23
acccacaagc ttatgccac ccccgacgcc accgccac aggccaaggg cttccgcagg      60
gccgtgtctg agttctgggc cggcggcgac gcctctggcg agttctacgc cgacgccatc    120
tggaccaact cttaccgaaa ggtgctgggc cagctgtctg cccgaaagct gctgcaggac   180
atcatgtctc gacagttcgg ctggaccctg aactctgccg gctacctgct gggcccccac   240
gccgtgggca accaccgatc ttggtctgac aagaacggcc tgacctcttt ctaccccctct   300 aagcccgaca ccccggcga ggacgccccc gccgaggacc tggcccgata ctactctgcc    360
ctgcgacact acatcaacct gatcacccga cagcgatact tctgctactg gcagaactgc    420
ccccgaggct tctgctacat ccagaactgc cccctgggct tcgacgccaa gcaggcagag    480
gccatcatgt cccgcggtt ccactctgac gccgtgtgga ccgacaacta cacccgactg    540
cgaaagcaga tggccgtgaa gaagtacctg aactctatcc tgaacttcgg ctcttcttgg    600
ctgtctcccg agcaccagcg agtgcagcag cgaaaggagt ctaagaagcc cccgccaag    660 ctgcagcccc gattcgacac catgcgatgc atggtgggcc gagtgtaccg accctgctgg    720
gaggtgttcg ccgaggacgg cttcaaggag ttctcttggg gcgaggactg gggcgagatc    780
tggttctacc tgggctacct ggagcagctg ctgcgattca ccaagcccg acccggcccc    840 ttcatggagc actggccgg cccctcacc gacggcgtga cctacaccaa cgactgcctg    900
ttcccctcgg agcccgggga cccctgag gctgtgcct tttgggctgg aggagatgct    960
tccggagaat ttatgctga tgctatttgg actaattcct atagaaaagt cctcggacaa   1020
ctctccgcta gaaaactcct ccaagatatt atgtccagac aatttggatg gactctcaat   1080
tccgctggat atcctccgg acctcatgct gtcggaaatc atagatcctg gtccgataaa   1140
aatggactca cttccttta tccttccaaa cctgataatc tggagaaga tgctcctgct   1200 gaagatctcg ctagatatta ttccgctctc agacattata ttaatctcat tactagacaa   1260
agatattttt gttattggca aaattgtcct agaggatttt gttatattca aaattgtcct   1320
```

```
ctcggatttg aggagaagga ggggaaggcc gtgctaaacc tgctctttca ttccgatgct    1380
gtctggactg ataattatac tagactcaga aaacaaatgg ctgtcaaaaa atatctcaat    1440
tccattctca attttggatc ctcctggctc tcccctgaac atcaaagagt ccaacaaaga    1500
aaagaatcca aaaaacctcc tgctaaactc caacctagat tgatactat gagatgtatg     1560
gtcggaagag tctatagacc ttgttgggaa gtctttgctg aagatggatt taaagaattt    1620
tcctggggag aagattgggg agaaatttgg ttttatctcg gatatctcga caactcctc     1680
agatttacta aacctagacc tggacctttt atggaacatt ggcctggacc ttttactgat    1740
ggagtcactt atactaatga ttgcctcttt accaagccct cggcgctgtc ccagctgtg     1800
aaggtgttct gggcaggcgg agacgcatcg ggtgagtttt acgcagatgc aatatggaca    1860
aactcgtatc ggaaggttct tggccagctt tcggcacgga aacttcttca agacataatg    1920
tcgcggcagt tcggatggac acttaattcg gcaggttacc ttcttggccc acatgcagtt    1980
ggaaaccacc ggtcgtggtc ggataagaat ggtcttacat cgttttatcc atcgaaacca    2040
gacaacccag gcgaagatgc accagcagag gaccttgcac ggtactattc ggcacttcgg    2100
cattacataa atcttataac acggcaacgg tatttctgct actggcagaa ctgtccacgg    2160
ggattttgct atatacaaaa ttgtccactt ggtttcgaag ccaaaatcca ccatctagag    2220
acccggcccg ccttccactc ggacgcagtt tggacagata actatacacg gcttcggaag    2280
cagatggcag ttaaaaagta ccttaattcg atacttaact ttggctcgtc gtggctttcg    2340
ccagagcatc aacgggttca gcaacggaaa gaatcgaaga aaccaccagc aaagcttcag    2400
ccacggttcg acacaatgcg gtgcatggtt ggacgggttt atcggccatg ttgggaggtt    2460
tttgcagaag atggtttcaa agagttttcg tggggcgaag actggggaga gatatggttc    2520
taccttggtt atcttgaaca acttcttcgg tttacaaagc cacggccagg cccattcatg    2580
gagcactggc caggaccatt tacagacggt gttacataca caaacgattg tctttttgtg    2640
cgcctcgagg tgcgccgagg ggacctggcc gccttttggg ccggtggtga tgcttctggt    2700
gaattctatg cagacgccat ctggaccaat tcctaccgaa aagtgctggg tcaactctcg    2760
gctagaaagc ttctgcagga tattatgtct cggcaatttg gttggactct caactccgca    2820
ggttatcttc tgggtccaca cgccgtcggt aatcatcgat cgtggtctga caaaaacggt    2880
ctcacatcct tctaccccttc gaagcccgat aatccaggtg aggacgctcc tgcagaagat    2940
cttgccagat attactctgc tctgcggcac tatataaacc tcatcacccg acagagatac    3000
ttttgttatt ggcaaaattg ccccggggt ttctgttaca ttcagaactg cccacttggt     3060
tttgaggctg cggccgtgca gccctaccaa gaccagacgt accagtcagt ctacttcgtg    3120
tctgagagct tcagtgacgc caaggacaag ctcaggagct atgcctcacg catccagcgc    3180
cccttctccg tgaagttcga cccgtacacg ctggccatcg acgtgctgga cagccccag     3240
gccgtgcggc gctccctgga gggtgtccag gatgagctgg acacccttgc ccatgcgctg    3300
agtgccattg ccatcacca ccatcaccat catcaccatc accaccatta aggtaccaca     3360
cat                                                                  3363
```

<210> SEQ ID NO 24
<211> LENGTH: 15
<212> TYPE: PRT
<213> ORGANISM: Artificial Sequence
<220> FEATURE:
<223> OTHER INFORMATION: FOL-005

<400> SEQUENCE: 24

```
Val Asp Thr Tyr Asp Gly Asp Ile Ser Val Val Tyr Gly Leu Arg
1               5                   10                  15

<210> SEQ ID NO 25
<211> LENGTH: 16
<212> TYPE: PRT
<213> ORGANISM: Artificial Sequence
<220> FEATURE:
<223> OTHER INFORMATION: FOL-014

<400> SEQUENCE: 25

Lys Pro Leu Ala Glu Ile Asp Ser Ile Glu Leu Ser Tyr Gly Ile Lys
1               5                   10                  15

<210> SEQ ID NO 26
<211> LENGTH: 15
<212> TYPE: PRT
<213> ORGANISM: Artificial Sequence
<220> FEATURE:
<223> OTHER INFORMATION: FOL-015

<400> SEQUENCE: 26

Leu Asp Gly Leu Val Arg Ala Tyr Asp Asn Ile Ser Pro Val Gly
1               5                   10                  15

<210> SEQ ID NO 27
<211> LENGTH: 16
<212> TYPE: PRT
<213> ORGANISM: Artificial Sequence
<220> FEATURE:
<223> OTHER INFORMATION: FOL-047

<400> SEQUENCE: 27

Lys Pro Leu Ala Gly Ile Asp Ser Ile Gly Leu Ser Tyr Gly Ile Lys
1               5                   10                  15

<210> SEQ ID NO 28
<211> LENGTH: 37
<212> TYPE: PRT
<213> ORGANISM: Artificial Sequence
<220> FEATURE:
<223> OTHER INFORMATION: Human amylin, hAMY

<400> SEQUENCE: 28

Lys Cys Asn Thr Ala Thr Cys Ala Thr Gln Arg Leu Ala Asn Phe Leu
1               5                   10                  15

Val His Ser Ser Asn Asn Phe Gly Ala Ile Leu Ser Thr Asn Val
            20                  25                  30

Gly Ser Asn Thr Tyr
        35

<210> SEQ ID NO 29
<211> LENGTH: 34
<212> TYPE: PRT
<213> ORGANISM: Artificial Sequence
<220> FEATURE:
<223> OTHER INFORMATION: Slim peptide PPY

<400> SEQUENCE: 29

Ile Lys Pro Glu Ala Pro Gly Glu Asp Ala Ser Pro Glu Glu Leu Asn
1               5                   10                  15

Arg Tyr Tyr Ala Ser Leu Arg His Tyr Leu Asn Leu Val Thr Arg Gln
            20                  25                  30

Arg Tyr
```

<210> SEQ ID NO 30
<211> LENGTH: 30
<212> TYPE: PRT
<213> ORGANISM: Artificial Sequence
<220> FEATURE:
<223> OTHER INFORMATION: Inducing peptide of insulin - 1

<400> SEQUENCE: 30

His Ala Glu Gly Thr Phe Thr Ser Asp Val Ser Ser Tyr Leu Glu Gly
1               5                   10                  15

Gln Ala Ala Lys Glu Phe Ile Ala Trp Leu Val Lys Gly Arg
            20                  25                  30

<210> SEQ ID NO 31
<211> LENGTH: 10
<212> TYPE: PRT
<213> ORGANISM: Artificial Sequence
<220> FEATURE:
<223> OTHER INFORMATION: Inducing peptide of insulin - 2

<400> SEQUENCE: 31

Leu Arg Ser Glu Leu Ala Ala Trp Ser Arg
1               5                   10

<210> SEQ ID NO 32
<211> LENGTH: 5
<212> TYPE: PRT
<213> ORGANISM: Artificial Sequence
<220> FEATURE:
<223> OTHER INFORMATION: Inducing peptide of insulin - 3

<400> SEQUENCE: 32

Lys Leu Pro Gly Tyr
1               5

<210> SEQ ID NO 33
<211> LENGTH: 6
<212> TYPE: PRT
<213> ORGANISM: Artificial Sequence
<220> FEATURE:
<223> OTHER INFORMATION: GLUT2 inhibitor peptide

<400> SEQUENCE: 33

Ala Thr Asn Pro Leu Phe
1               5

<210> SEQ ID NO 34
<211> LENGTH: 6
<212> TYPE: PRT
<213> ORGANISM: Artificial Sequence
<220> FEATURE:
<223> OTHER INFORMATION: SGLT1 inhibitor peptide

<400> SEQUENCE: 34

Leu Ser Val Ser Val Leu
1               5

<210> SEQ ID NO 35
<211> LENGTH: 10
<212> TYPE: PRT
<213> ORGANISM: Artificial Sequence
<220> FEATURE:
<223> OTHER INFORMATION: Peptide inhibitor of amylin aggregation

<400> SEQUENCE: 35

Arg Gly Ala Asn Phe Leu Val His Gly Arg
1               5                   10

<210> SEQ ID NO 36
<211> LENGTH: 22
<212> TYPE: PRT
<213> ORGANISM: Artificial Sequence
<220> FEATURE:
<223> OTHER INFORMATION: SGLT1 inhibitor peptide - 2

<400> SEQUENCE: 36

Asp Lys Leu Thr Thr Arg Glu Ile Glu Gln Val Glu Leu Leu Lys Arg
1               5                   10                  15

Ile Tyr Asp Lys Leu Thr
            20

<210> SEQ ID NO 37
<211> LENGTH: 36
<212> TYPE: PRT
<213> ORGANISM: Artificial Sequence
<220> FEATURE:
<223> OTHER INFORMATION: Insulin mimetic peptide S519

<400> SEQUENCE: 37

Ser Leu Glu Glu Glu Trp Ala Gln Val Glu Cys Glu Val Tyr Gly Arg
1               5                   10                  15

Gly Cys Pro Ser Gly Ser Leu Asp Glu Ser Phe Tyr Asp Trp Phe Glu
            20                  25                  30

Arg Gln Leu Gly
        35

<210> SEQ ID NO 38
<211> LENGTH: 33
<212> TYPE: PRT
<213> ORGANISM: Artificial Sequence
<220> FEATURE:
<223> OTHER INFORMATION: RG33 ApoA1-derived peptide

<400> SEQUENCE: 38

Pro Ala Leu Glu Asp Leu Arg Gln Gly Leu Leu Pro Val Leu Glu Ser
1               5                   10                  15

Phe Lys Val Ser Phe Leu Ser Ala Leu Glu Glu Tyr Thr Lys Lys Leu
            20                  25                  30

Asn

<210> SEQ ID NO 39
<211> LENGTH: 18
<212> TYPE: PRT
<213> ORGANISM: Artificial Sequence
<220> FEATURE:
<223> OTHER INFORMATION: ApoA1 mimetic peptide

<400> SEQUENCE: 39

Phe Ala Glu Lys Phe Lys Glu Ala Val Lys Asp Tyr Phe Ala Lys Phe
1               5                   10                  15

Trp Asp

<210> SEQ ID NO 40
<211> LENGTH: 10
<212> TYPE: PRT
<213> ORGANISM: Artificial Sequence
<220> FEATURE:
<223> OTHER INFORMATION: Blood glucose lowering peptide -continued

```
<400> SEQUENCE: 40

Gly His Pro Tyr Tyr Ser Ile Lys Lys Ser
1               5                   10

<210> SEQ ID NO 41
<211> LENGTH: 1122
<212> TYPE: PRT
<213> ORGANISM: Artificial Sequence
<220> FEATURE:
<223> OTHER INFORMATION: Recombinant protein comprising multiple sets of
      multi-peptide associated with controlling plasma glucose for
      diabetes treatment

<400> SEQUENCE: 41

Met Pro Thr Pro Asp Ala Thr Thr Pro Gln Ala Lys Gly Phe Arg Arg
1               5                   10                  15

Ala Val Ser Glu Phe Val Asp Thr Tyr Asp Gly Asp Ile Ser Val Val
                20                  25                  30

Tyr Gly Leu Arg Phe Lys Pro Leu Ala Glu Ile Asp Ser Ile Glu Leu
            35                  40                  45

Ser Tyr Gly Ile Lys Phe Leu Asp Gly Leu Val Arg Ala Tyr Asp Asn
        50                  55                  60

Ile Ser Pro Val Gly Phe Lys Pro Leu Ala Gly Ile Asp Ser Ile Gly
65                  70                  75                  80

Leu Ser Tyr Gly Ile Lys Phe Lys Cys Asn Thr Ala Thr Cys Ala Thr
                85                  90                  95

Gln Arg Leu Ala Asn Tyr Leu Val His Ser Ser Asn Asn Leu Gly Ala
                100                 105                 110

Ile Leu Ser Ser Thr Asn Val Gly Ser Asn Thr Tyr Phe Trp Ala Glu
            115                 120                 125

Lys Trp Lys Glu Ala Val Lys Asp Tyr Trp Ala Lys Leu Trp Asp Phe
        130                 135                 140

Asp Ala Lys Gln Ala Glu Ala Ile Met Ser Pro Arg Phe Ile Lys Pro
145                 150                 155                 160

Glu Ala Pro Gly Glu Asp Ala Ser Pro Glu Glu Leu Asn Arg Tyr Tyr
                165                 170                 175

Ala Ser Leu Arg His Tyr Leu Asn Leu Val Thr Arg Gln Arg Tyr Phe
            180                 185                 190

Ile Pro Ile Phe His Ala Glu Gly Thr Trp Thr Ser Asp Val Ser Ser
        195                 200                 205

Tyr Leu Glu Gly Gln Ala Ala Lys Glu Trp Ile Ala Trp Leu Val Lys
    210                 215                 220

Gly Arg Phe Leu Arg Ser Glu Leu Ala Ala Trp Ser Arg Phe Lys Leu
225                 230                 235                 240

Pro Gly Tyr Phe Ala Thr Asn Pro Leu Trp Phe Leu Ser Val Ser Val
                245                 250                 255

Leu Phe Gly His Pro Tyr Tyr Ser Ile Lys Lys Ser Phe Pro Ser Glu
            260                 265                 270

Pro Gly Asp Pro Leu Glu Ala Val Ala Phe Arg Gly Ala Asn Trp Leu
        275                 280                 285

Val His Gly Arg Phe Asp Lys Leu Thr Thr Arg Glu Ile Glu Gln Val
    290                 295                 300

Glu Leu Leu Lys Arg Ile Tyr Asp Lys Leu Thr Phe Ser Leu Glu Glu
305                 310                 315                 320

Glu Trp Ala Gln Val Glu Cys Glu Val Tyr Gly Arg Gly Cys Pro Ser
                325                 330                 335
```

```
Gly Ser Leu Asp Glu Ser Trp Tyr Asp Trp Trp Glu Arg Gln Leu Gly
            340                 345                 350

Phe Pro Ala Leu Glu Asp Leu Arg Gln Gly Leu Leu Pro Val Leu Glu
            355                 360                 365

Ser Trp Lys Val Ser Trp Leu Ser Ala Leu Glu Tyr Thr Lys Lys
370                 375                 380

Leu Asn Phe Glu Glu Lys Glu Gly Lys Ala Val Leu Asn Leu Leu Phe
385                 390                 395                 400

Val Asp Thr Tyr Asp Gly Asp Ile Ser Val Val Tyr Gly Leu Arg Phe
            405                 410                 415

Lys Pro Leu Ala Glu Ile Asp Ser Ile Glu Leu Ser Tyr Gly Ile Lys
            420                 425                 430

Phe Leu Asp Gly Leu Val Arg Ala Tyr Asp Asn Ile Ser Pro Val Gly
            435                 440                 445

Phe Lys Pro Leu Ala Gly Ile Asp Ser Ile Gly Leu Ser Tyr Gly Ile
            450                 455                 460

Lys Phe Lys Cys Asn Thr Ala Thr Cys Ala Thr Gln Arg Leu Ala Asn
465                 470                 475                 480

Tyr Leu Val His Ser Ser Asn Asn Leu Gly Ala Ile Leu Ser Ser Thr
            485                 490                 495

Asn Val Gly Ser Asn Thr Tyr Phe Trp Ala Glu Lys Trp Lys Glu Ala
            500                 505                 510

Val Lys Asp Tyr Trp Ala Lys Leu Trp Asp Phe Thr Lys Pro Ser Ala
            515                 520                 525

Leu Ser Arg Ala Val Lys Val Phe Ile Lys Pro Glu Ala Pro Gly Glu
            530                 535                 540

Asp Ala Ser Pro Glu Glu Leu Asn Arg Tyr Tyr Ala Ser Leu Arg His
545                 550                 555                 560

Tyr Leu Asn Leu Val Thr Arg Gln Arg Tyr Phe Ile Pro Ile Phe His
            565                 570                 575

Ala Glu Gly Thr Trp Thr Ser Asp Val Ser Ser Tyr Leu Glu Gly Gln
            580                 585                 590

Ala Ala Lys Glu Trp Ile Ala Trp Leu Val Lys Gly Arg Phe Leu Arg
            595                 600                 605

Ser Glu Leu Ala Ala Trp Ser Arg Phe Lys Leu Pro Gly Tyr Phe Ala
            610                 615                 620

Thr Asn Pro Leu Trp Phe Leu Ser Val Ser Val Leu Phe Gly His Pro
625                 630                 635                 640

Tyr Tyr Ser Ile Lys Lys Ser Phe Glu Ala Lys Ile His His Leu Glu
            645                 650                 655

Thr Arg Pro Ala Phe Arg Gly Ala Asn Trp Leu Val His Gly Arg Phe
            660                 665                 670

Asp Lys Leu Thr Thr Arg Glu Ile Glu Gln Val Glu Leu Leu Lys Arg
            675                 680                 685

Ile Tyr Asp Lys Leu Thr Phe Ser Leu Glu Glu Trp Ala Gln Val
            690                 695                 700

Glu Cys Glu Val Tyr Gly Arg Gly Cys Pro Ser Gly Ser Leu Asp Glu
705                 710                 715                 720

Ser Trp Tyr Asp Trp Trp Glu Arg Gln Leu Gly Phe Pro Ala Leu Glu
            725                 730                 735

Asp Leu Arg Gln Gly Leu Leu Pro Val Leu Glu Ser Trp Lys Val Ser
            740                 745                 750
```

```
Trp Leu Ser Ala Leu Glu Glu Tyr Thr Lys Lys Leu Asn Phe Val Arg
            755                 760                 765
Leu Glu Val Arg Arg Gly Asp Leu Ala Ala Phe Val Asp Thr Tyr Asp
        770                 775                 780
Gly Asp Ile Ser Val Val Tyr Gly Leu Arg Phe Lys Pro Leu Ala Glu
785                 790                 795                 800
Ile Asp Ser Ile Glu Leu Ser Tyr Gly Ile Lys Phe Leu Asp Gly Leu
                805                 810                 815
Val Arg Ala Tyr Asp Asn Ile Ser Pro Val Gly Phe Lys Pro Leu Ala
            820                 825                 830
Gly Ile Asp Ser Ile Gly Leu Ser Tyr Gly Ile Lys Phe Lys Cys Asn
        835                 840                 845
Thr Ala Thr Cys Ala Thr Gln Arg Leu Ala Asn Tyr Leu Val His Ser
    850                 855                 860
Ser Asn Asn Leu Gly Ala Ile Leu Ser Ser Thr Asn Val Gly Ser Asn
865                 870                 875                 880
Thr Tyr Phe Trp Ala Glu Lys Trp Lys Glu Ala Val Lys Asp Tyr Trp
                885                 890                 895
Ala Lys Leu Trp Asp Phe Leu Leu Ser Gly Val Arg Gln Val Ser Glu
            900                 905                 910
Asp Val Phe Ile Lys Pro Glu Ala Pro Gly Glu Asp Ala Ser Pro Glu
        915                 920                 925
Glu Leu Asn Arg Tyr Tyr Ala Ser Leu Arg His Tyr Leu Asn Leu Val
    930                 935                 940
Thr Arg Gln Arg Tyr Phe Ile Pro Ile Phe His Ala Glu Gly Thr Trp
945                 950                 955                 960
Thr Ser Asp Val Ser Ser Tyr Leu Glu Gly Gln Ala Ala Lys Glu Trp
                965                 970                 975
Ile Ala Trp Leu Val Lys Gly Arg Phe Leu Arg Ser Glu Leu Ala Ala
            980                 985                 990
Trp Ser Arg Phe Lys Leu Pro Gly Tyr Phe Ala Thr Asn Pro Leu Trp
        995                 1000                1005
Phe Leu Ser Val Ser Val Leu Phe Gly His Pro Tyr Tyr Ser Ile
    1010                1015                1020
Lys Lys Ser Phe Glu Ala Ala Ala Val Gln Pro Tyr Gln Asp Gln
    1025                1030                1035
Thr Tyr Gln Ser Val Tyr Phe Val Ser Glu Ser Phe Ser Asp Ala
    1040                1045                1050
Lys Asp Lys Leu Arg Ser Tyr Ala Ser Arg Ile Gln Arg Pro Phe
    1055                1060                1065
Ser Val Lys Phe Asp Pro Tyr Thr Leu Ala Ile Asp Val Leu Asp
    1070                1075                1080
Ser Pro Gln Ala Val Arg Arg Ser Leu Glu Gly Val Gln Asp Glu
    1085                1090                1095
Leu Asp Thr Leu Ala His Ala Leu Ser Ala Ile Gly His His His
    1100                1105                1110
His His His His His His His
    1115                1120

<210> SEQ ID NO 42
<211> LENGTH: 3393
<212> TYPE: DNA
<213> ORGANISM: Artificial Sequence
<220> FEATURE:
<223> OTHER INFORMATION: DNA of recombinant protein comprising multiple
``` sets of multi-peptide associated with controlling plasma glucose
for diabetes treatment

<400> SEQUENCE: 42

| | | | | |
|---|---|---|---|---|
| acccacaagc | ttatgcccac | ccccgacgcc | accacgccac | aggccaaggg | cttccgcagg | 60 |
| gccgtgtctg | agttcgtgga | cacctacgac | ggcgacatct | ctgtggtgta | cggcctgcga | 120 |
| ttcaagcccc | tggccgagat | cgactctatc | gagctgtctt | acggcatcaa | gttcctggac | 180 |
| ggcctggtgc | gagcctacga | caacatctct | cccgtgggct | tcaagcccct | ggccggcatc | 240 |
| gactctatcg | gcctgtctta | cggcatcaag | ttcaagtgca | acaccgccac | ctgcgccacc | 300 |
| cagcgactgg | ccaactacct | ggtgcactct | tctaacaacc | tgggcgccat | cctgtcttct | 360 |
| accaacgtgg | gctctaacac | ctacttctgg | gccgagaagt | ggaaggaggc | cgtgaaggac | 420 |
| tactgggcca | agctgtggga | cttcgacgcc | aagcaggcag | aggccatcat | gtccccgcgg | 480 |
| ttcatcaagc | ccgaggcccc | cggcgaggac | gcctctcccg | aggagctgaa | ccgatactac | 540 |
| gcctctctgc | gacactacct | gaacctggtg | acccgacagc | gatacttcat | ccccatcttc | 600 |
| cacgccgagg | gcacctggac | ctctgacgtg | tcttcttacc | tggagggcca | ggccgccaag | 660 |
| gagtggatcg | cctggctggt | gaagggccga | ttcctgcgat | ctgagctggc | cgcctggtct | 720 |
| cgattcaagc | tgcccggcta | cttcgccacc | aaccccctgt | ggttcctgtc | tgtgtctgtg | 780 |
| ctgttcggcc | accctacta | ctctatcaag | aagtctttcc | cctcggagcc | cggggacccc | 840 |
| ctggaggctg | tggccttccg | aggcgccaac | tggctggtgc | acggccgatt | cgacaagctg | 900 |
| accacccgag | agatcgagca | ggtggagctg | ctgaagcgaa | tctacgacaa | gctgaccttc | 960 |
| tctctggagg | aggagtgggc | ccaggtggag | tgcgaggtgt | acgccgaggg | ctgcccctct | 1020 |
| ggctctctgg | acgagtcttg | gtacgactgg | tgggagcgac | agctgggctt | ccccgccctg | 1080 |
| gaggacctgc | gacagggcct | gctgcccgtg | ctggagtctt | ggaaggtgtc | ttggctgtct | 1140 |
| gccctggagt | agtacaccaa | gaagctgaac | ttcgaggaga | aggaggggaa | ggccgtgcta | 1200 |
| aacctgctct | ttgtcgatac | ttatgatgga | gatatttccg | tcgtctatgg | actcagattt | 1260 |
| aaacctctcg | ctgaaattga | ttccattgaa | ctctcctatg | gaattaaatt | tctcgatgga | 1320 |
| ctcgtcagag | cttatgataa | tatttcccct | gtcggattta | aacctctcgc | tggaattgat | 1380 |
| tccattggac | tctcctatgg | aattaaattt | aaatgtaata | ctgctacttg | tgctactcaa | 1440 |
| agactcgcta | attatctcgt | ccattcctcc | aataatctcg | gagctattct | ctcctccact | 1500 |
| aatgtcggat | ccaatactta | tttttgggct | gaaaaatgga | agaagctgt | caaagattat | 1560 |
| tgggctaaac | tctgggattt | taccaagccc | tcggcgctgt | cccgagctgt | gaaggtgttt | 1620 |
| attaaacctg | aagctcctgg | agaagatgct | tcccctgaag | aactcaatag | atattatgct | 1680 |
| tccctcagac | attatctcaa | tctcgtcact | agacaaagat | attttattcc | tattttcat | 1740 |
| gctgaaggaa | cttggacttc | cgatgtctcc | tcctatctcg | aaggacaagc | tgctaaagaa | 1800 |
| tggattgctt | ggctcgtcaa | aggaagattt | ctcagatccg | aactcgctgc | ttggtccaga | 1860 |
| tttaaactcc | ctggatattt | tgctactaat | cctctctggt | ttctctccgt | ctccgtcctc | 1920 |
| tttggacatc | cttattattc | cattaaaaaa | tcctttgaag | ccaaaatcca | ccatctagag | 1980 |
| acccggcccg | cctttagagg | agctaattgg | ctcgtccatg | gaagatttga | taaactcact | 2040 |
| actagagaaa | ttgaacaagt | cgaactcctc | aaaagaattt | atgataaact | cacttttcc | 2100 |
| ctcgaagaag | aatgggctca | agtcgaatgt | gaagtctatg | gaagaggatg | tccttccgga | 2160 |
| tccctcgatg | aatcctggta | tgattggtgg | gaaagacaac | tcggatttcc | tgctctcgaa | 2220 |

```
gatctcagac aaggactcct ccctgtcctc gaatcctgga aagtctcctg gctctccgct    2280
ctcgaagaat atactaaaaa actcaattt gtgcgcctcg aggtgcgccg aggggacctg    2340
gccgcctttg ttgacacata tgatggtgac atatcggttg tttacggtct tcggttcaag    2400
ccacttgcag agatagattc gatagaactt tcgtatggta taaaatttct tgacggtctt    2460
gttcgggcat acgataacat atcgccagtt ggtttcaagc cacttgcagg tatagactcg    2520
ataggtcttt cgtatggtat aaaatttaag tgcaatacag caacatgtgc aacacaacgg    2580
cttgcaaact accttgttca ctcgtcgaat aaccttggtg caatactttc gtcgacaaat    2640
gttggttcga acacatattt ctgggcagag aaatggaagg aagcagttaa agattactgg    2700
gcaaagcttt gggactttct gctcagtggt gtgcgccagg tgtcagagga cgtgttcata    2760
aagccagagg caccaggtga agatgcatcg ccagaggaac ttaaccggta ttacgcatcg    2820
cttcggcatt atcttaatct tgttacacgg cagcggtact ttataccaat attccacgca    2880
gagggtacat ggacatcgga cgtttcgtcg tatcttgaag gtcaagcagc aaaagagtgg    2940
atagcatggc ttgttaaggg tcggtttctt cggtcggaac ttgcagcatg gtcgcggttc    3000
aaacttccag gttactttgc aacaaaccca ctttggttcc tttcggtttc ggttcttttt    3060
ggtcatccat attactcgat aaagaaatcg ttcgaggctg cggccgtgca gccctaccaa    3120
gaccagacgt accagtcagt ctacttcgtg tctgagagct tcagtgacgc caaggacaag    3180
ctcaggagct atgcctcacg catccagcgc cccttctccg tgaagttcga cccgtacacg    3240
ctggccatcg acgtgctgga cagcccccag gccgtgcggc gctccctgga gggtgtccag    3300
gatgagctgg acaccctgc ccatgcgctg agtgccattg gccatcacca ccatcaccat    3360
catcaccatc accaccatta aggtaccaca cat                                3393
```